May 17, 1955

G. D. HULST 2,708,728

CATHODE-RAY DEFLECTION CIRCUIT

Filed Sept. 28, 1950

INVENTOR.
GEORGE D. HULST
BY Darby & Darby
ATTORNEYS

United States Patent Office 2,708,728

Patented May 17, 1955

2,708,728

CATHODE-RAY DEFLECTION CIRCUIT

George D. Hulst, Upper Montclair, N. J., assignor to Allen B. Du Mont Laboratories, Inc., Clifton, N. J., a corporation of Delaware Application September 28, 1950, Serial No. 187,269

17 Claims. (Cl. 315—27)

This invention relates to deflection circuits for cathode-ray tubes.

To obtain deflection in a cathode-ray picture tube of a television receiver, a current of sawtooth wave form is usually made to flow through a deflection yoke which conforms physically close to the contours of the neck of the picture tube. It is desirable that the deflection wave form be correct and that the deflection circuits be simple and conserve power. To these ends a damper tube has been employed, and various energy saving schemes have been utilized. Damper tubes and associated circuits add to the cost of a television receiver.

It is an object of this invention to conserve deflection power.

It is another object to provide a deflection system providing a substantially linear sawtooth current of good wave form in a deflection yoke.

It is a further object to eliminate the need for a damper tube in an electromagnetic deflection system.

It is a further object to provide an electromagnetic deflection system not requiring a transformer.

It is a still further object to provide a novel and convenient means for adjusting linearity in a deflection system.

In accordance with the invention the deflection yoke is connected in a multi-element network which stores deflection energy dynamically from one cycle to the next in a manner analogous to that of a tank circuit or pendulum so that only a relatively small amount of deflection energy need be supplied each cycle to the system.

Figure 1:
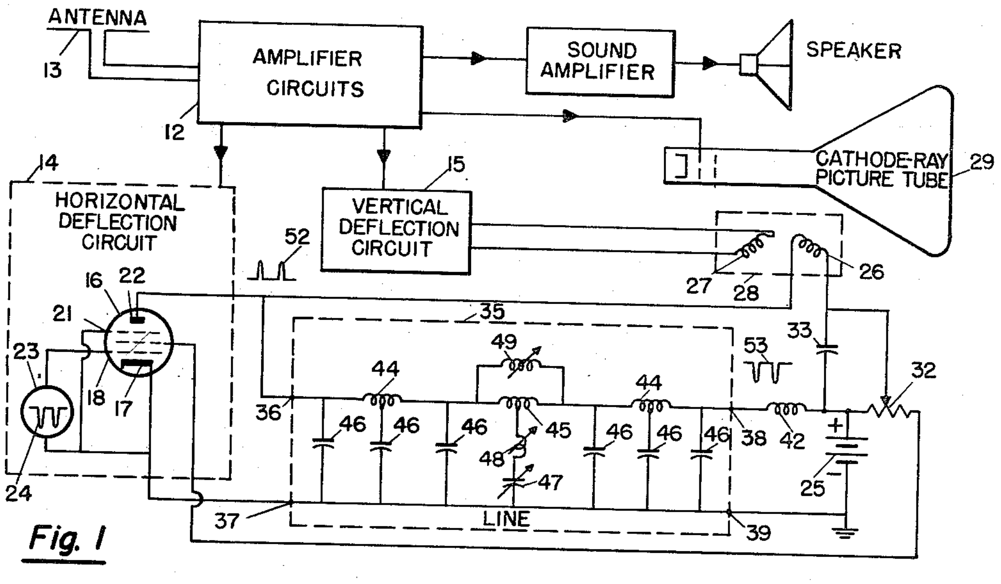
Fig. 1 is a diagram, partly in schematic and partly in block form, of a television receiver incorporating the invention.

The television receiver of Fig. 1 contains amplifier stages 12 shown in block form connected to and receiving a signal from an antenna 13. A horizontal deflection circuit 14 and a vertical deflection circuit 15 are connected to and receive signals from the amplifier stages 12. A horizontal deflection amplifier tube 16, contained in and forming a part of the horizontal deflection circuit, preferably is of the high impedance output type such as a power pentode, and contains a cathode 17, a control grid 18, a screen grid 19, a suppressor or beam forming grid 21, and an anode 22.

In the connection shown, the control grid 18 and cathode 17 are input electrodes and the anode 22 and cathode 17 are output electrodes. A source 23 of unsymmetrical periodic signals is connected between the input electrodes 17, 18 in such polarity that the grid 18 is driven negative periodically, rendering the tube 16 non-conductive for approximately one eighth of the total time of a period. Although the source 23 is shown here independent of the tube 16, it lies within the scope of the invention to connect the grid of the tube 16 within the output circuit of the anode 22, so that the tube 16 functions as an oscillator.

The screen grid 19 of the tube 16 is connected to a source 25 of positive potential. The anode 22 is connected to a horizontal deflection coil 26 which preferably is associated with a vertical deflection coil 27 in a deflection yoke 28, providing electromagnetic deflection for a cathode-ray picture tube 29. The other end of the horizontal deflection coil 26 is connected to the tap of a variable resistor 32 and to a bypass capacitor 33, and this in turn is connected to the source 25 of positive potential. By controlling the amount of direct current of the tube 16 flowing through the coil 26, the variable resistor 32 acts as a horizontal centering control. Because the source 25 and the bypass capacitor 33 have negligible impedance at the horizontal deflection frequency, the deflection coil 26 is effectively connected in parallel with the deflection amplifier tube 16.

A transmission line 35 which is a featured element in the inventive combination is outlined in broken lines and provided with two pairs of terminals at its opposite ends. The terminals 36, 37 comprising one pair of terminals, are connected respectively to the output electrodes 22, 17, of the amplifier tube 16 in parallel therewith and also effectively in parallel with the deflection coil 26. The other pairs of terminals 38, 39 are connected to the series combination of a terminating inductance 42 and the source 25. Since the impedance of the source 25 is negligible at horizontal deflection frequency, this end of the transmission line 35 is terminated at that frequency in the inductance 42.

The preferred form of transmission line 35 is that of a low pass filter, comprising a plurality of inductors 44, 45 as series members and a plurality of capacitors 46, 47 as shunt members. The inductive members 44, 45 are preferably tapped to provide mutual inductance as shown. One of the capacitors 47 is preferably made variable. A variable inductance 48 is preferably connected in one of the shunt arms in series with one of the capacitors 47, although this capacitor need not be the variable one. One of the inductors 45 is preferably bridged with a variable inductance 49.

The transmission line shown is one in which the part within the dotted outline is an *m*-derived filter with a value of *m* greater than one. The yoke 26 and the terminating inductance 42 constitute constant-*k* terminal sections of this filter, which then may be considered to be closed or short circuited at each end, by the source 25 and the capacitor 33 respectively. The entire line, including the yoke 26 and the inductance 42, is such as to pass without appreciable amplitude or phase distortion the fundamental and approximately the first 10 harmonics of the horizontal deflection frequency and to have an electrical length approximately equal to one-half wave length at this frequency. To fulfill these conditions with a minimum number of component elements, the overall *m*-value of the filter including the yoke 26 and the inductance 42 should be approximately 1.27.

Although the invention would be operative with transmission lines having an electrical length of any integral multiple of ½ wave length, the additional losses in the system, and the additional cost of these components, make one-half wave length preferable.

Although the general construction of constant time delay transmission lines does not form a part of this invention, a feature of my invention lies in the inclusion in the filter of three substantially independent controls to adjust high, low, and medium harmonic frequencies to the correct phase delay. The variable capacitor 47 controls the electrical length of the line without affecting the *m*-value. The variable inductors 48 and 49 affect both the electrical length and the *m*-value of the filter, but in opposite directions, so that the desired independent control of phase delay through the filter of three frequency regions is obtained.

In the operation of the deflection circuit a deflection wave of the wave form 24 is provided by the source 23. This is amplified in the deflection amplifier tube 16, providing a sawtooth current of relatively small amplitude in the deflection coil 26 and an impulse voltage 52 across it, since the impedance of deflection coil 26 is at these frequencies mainly inductive. The impulse wave enters the transmission line at input terminals 36, 37, travels its length to the closed end of the terminal inductance 42, and is reflected back again in inverse polarity to the closed or short circuited end of the coil 26. It arrives back at the input terminals 36, 37 in exact synchronism with a second impulse from the periodic source 23, amplified in the tube 16. Since the two waves are in synchronism, the waves in a properly adjusted line will build up successively into stronger and stronger impulse waves, providing correspondingly stronger sawtooth deflection current in the deflection coil. The build-up of waves will continue until an equilibrium condition obtains, wherein the energy losses incurred in the system are sufficient to equal the drive energy supplied by the tube 16.

It is therefore desirable to utilize reactive elements in the deflection circuit having low loss in the reactive elements or high Q. Since there is no damper tube and no output transformer, a very appreciable power saving can occur.

In adjusting the transmission line, the variable elements can be treated as the usual linearity adjustments and aligned with a test pattern or a set of linearity bars. If the tolerances of the reactive members of the deflection be kept within sufficiently close tolerances, one or more of the elements 47, 48, or 49 may be made fixed instead of variable, and economies realized thereby.

Figures 2, 3:
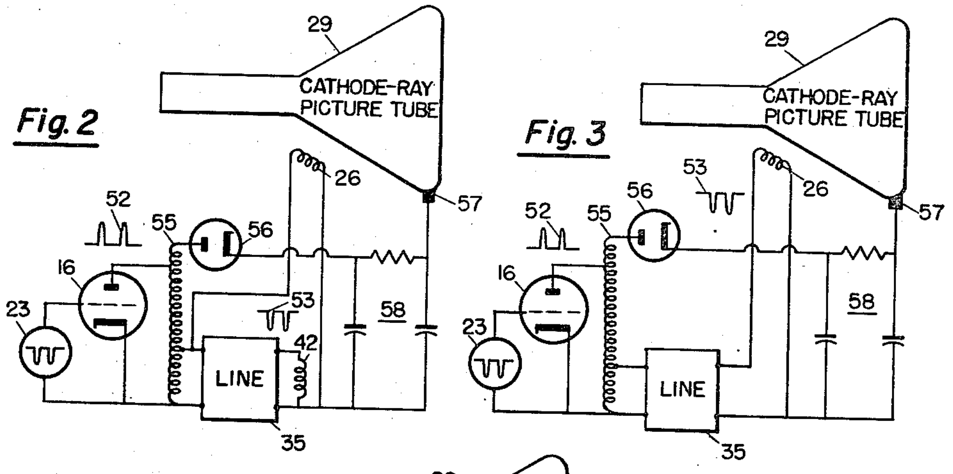
Figs. 2, 3 and 4 are schematic diagrams of alternative embodiments of the invention.
Figure 4:
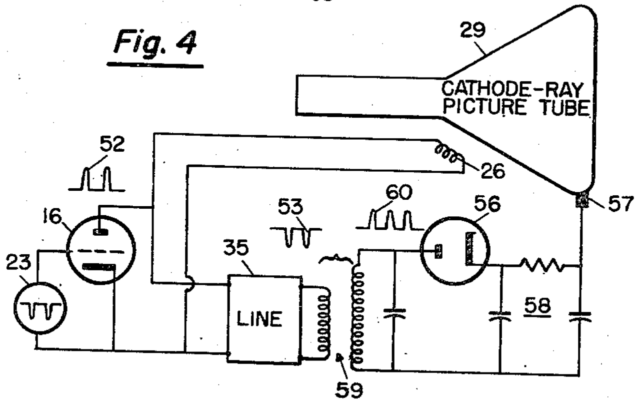

Other embodiments of the invention are shown in Figures 2, 3, and 4.

In Figure 2, a transformer 55 couples the anode of a high voltage rectifier 56 to the deflection tube 16, the cathode of the rectifier 56 being connected to a second anode connector 57 of the picture tube 29 through a filter 58.

In Figure 3, the deflection coil 26 is connected at the opposite end of the line 35 from the tube 16 and the rectifier 56, in place of the inductor 42 of Figure 1.

In Figure 4, the high voltage rectifier tube 56 is connected at the opposite end of the line 35 from the deflection tube 16 through a phase inverting transformer 59 as indicated by the relative polarities of the wave forms 53 and 60.

Although specific embodiments of the invention have been shown and described, the scope of the invention is as delineated in the following claims.

What is claimed is:

1. An electromagnetic deflection system comprising a wave-reflecting transmission line having a pair of terminals and a network connected thereto having a plurality of inductances connected in series between said terminals and a plurality of condensers connected between one of said terminals and respective different points on said series-connected inductances, a deflection coil connected between said pair of terminals, a deflection amplifier having a pair of input electrodes and a pair of output electrodes, said pair of output electrodes being connected respectively to said pair of terminals to which said deflection coil is attached, said transmission line, said coil, and said deflection amplifier being connected in parallel, and a source of periodic signals connected between said input electrodes, the repetition rate of said periodic signals being in synchronism with the wave-reflective period of said transmission line.

2. An electromagnetic deflection system for a cathode-ray tube having a high-voltage electrode, comprising a transmission line having a pair of input terminals, a transformer connected to said input terminals, a source of repetitive deflection signals connected to said transformer, rectifier means connected between said transformer and said high-voltage electrode, and a cathode-ray deflection coil connected to said transmission line to be energized thereby, said transmission line having an electrical wavelength approximately equal to an integral multiple of one-half wavelength of the repetitive frequency of said signals.

3. The system in accordance with claim 2, in which said deflection coil is connected between said input terminals.

4. The system in accordance with claim 2, in which said transmission line has an output terminal, and said deflection coil is connected between one of said input terminals and said output terminal.

5. The system in accordance with claim 2, in which said transmission line has a pair of output terminals and said deflection coil is connected to said pair of output terminals.

6. An electromagnetic deflection system for a cathode-ray tube having a high-voltage electrode, comprising a transmission line having a pair of inlet terminals and a pair of output terminals, a source of repetitive deflection signals connected to said input terminals, a cathode-ray deflection coil connected to said input terminals, a transformer connected to said output terminals, and rectifier means connected between said transformer and said high-voltage electrode, said transmission line having an electrical wavelength approximately equal to an integral multiple of one-half wavelength of the repetitive frequency of said signals.

7. An electromagnetic deflection system comprising a wave-reflecting transmission line having a plurality of input terminals and an output terminal, a source of repetitive deflection signals connected to said input terminals, and a deflection coil connected between said output terminal and one of said input terminals, said transmission line having an electrical wavelength approximately equal to an integral multiple of one-half wavelength of the repetitive frequency of said signals, whereby the signals reflected in said transmission line arrive at said input terminals in synchronism with said repetitive deflection signals.

8. An electromagnetic deflection system comprising a transmission line having a pair of input terminals and a pair of output terminals, a source of repetitive deflection signals connected to said input terminals, a terminating impedance and a source of voltage connected in series between said output terminals, and a deflection coil connected between one of said input terminals and the junction of said impedance and source of voltage, said transmission line having an electrical wavelength approximately equal to an integral multiple of one-half wavelength of the repetitive frequency of said signals.

9. The system in accordance with claim 8, in which said connection of said coil to said junction comprises a variable resistance to provide a centering control.

10. An electromagnetic deflection system comprising a wave-reflecting transmission line, a source of repetitive deflection signals connected to said transmission line, and a deflection coil connected to receive signals from said transmission line, said transmission line having an electrical wavelength approximately equal to an integral multiple of one-half wavelength of the repetitive frequency of said signals and comprising a plurality of series-connected inductances one of which is variable to provide a linearity adjustment, the repetition rate of said repetitive deflection signals being in synchronism with the wave-reflective period of said transmission line.

11. An electromagnetic deflection system comprising a transmission line having a pair of input terminals and an output terminal, a source of repetitive reflection signals connected to said input terminals, and a deflection coil connected to receive signals from said transmission line, said transmission line having an electrical wavelength approximately equal to an integral multiple of one-half wavelength of the repetitive frequency of said signals and comprising an inductance connected between one of said input terminals and said output terminal and a capacitance connected between said inductance and the remaining one of said input terminals, said capacitance being variable to provide a linearity adjustment.

12. The system in accordance with claim 10, in which a variable inductance is connected in series with said capacitance to provide a second linearity adjustment.

13. An electromagnetic deflection system comprising a source of repetitive deflection signals, a wave-reflecting transmission line connected to said source to receive said signals and having an electrical wavelength approximately equal to an integral multiple of one-half wavelength of the repetitive frequency of said signals, said transmission line having a pair of signal output terminals and providing an output signal at said terminals, and a deflection coil connected between said signal output terminal, the repetition rate of said repetitive deflection signals being in synchronism with the wave-reflective period of said transmission line.

14. The system in accordance with claim 13, in which said transmission line comprises two electrical ends, each said end respectively having a pair of electrical line terminals, said source of signals being connected across one of said pairs of line terminals.

15. The system in accordance with claim 14, in which said signal output terminals are the line terminals to which said source of signals is connected.

16. The system in accordance with claim 14, in which said signal output terminals are the remaining said line terminals.

17. The system in accordance with claim 14, in which said pair of signal output terminals comprises one terminal of each of said pairs of line terminals.

References Cited in the file of this patent

UNITED STATES PATENTS

| | | |
|---|---|---|
| 2,149,077 | Vance | Feb. 28, 1939 |
| 2,189,916 | Messner | Feb. 13, 1940 |
| 2,223,990 | Holmes | Dec. 3, 1940 |
| 2,299,571 | Dome | Oct. 20, 1942 |
| 2,384,717 | Wilson | Sept. 11, 1945 |
| 2,470,197 | Torsch | May 17, 1949 |
| 2,499,080 | Webb | Feb. 28, 1950 |
| 2,545,346 | Edelsohn | Mar. 13, 1951 |
| 2,555,831 | Tourshou | June 5, 1951 |
| 2,608,672 | Miller | Aug. 26, 1952 |